April 21, 1925.

W. R. HESLEWOOD

PISTON RING

Filed July 25, 1922

1,534,386

INVENTOR
WILLIAM R. HESLEWOOD
BY Dewey, Strong, Townsend and Loftus
ATTYS.

Patented Apr. 21, 1925.

1,534,386

UNITED STATES PATENT OFFICE.

WILLIAM R. HESLEWOOD, OF OAKLAND, CALIFORNIA, ASSIGNOR TO M. AND H. PISTON RING CO., OF OAKLAND, CALIFORNIA, A CORPORATION OF NEVADA.

PISTON RING.

Application filed July 25, 1922. Serial No. 577,285.

*To all whom it may concern:*

Be it known that I, WILLIAM R. HESLEWOOD, a citizen of the United States, residing at Oakland, county of Alameda, and State of California, have invented new and useful Improvements in Piston Rings, of which the following is a specification.

This invention relates to piston rings and especially to that type employed in internal combustion engines and the like.

The object of the present invention is to provide a piston ring particularly adapted for internal combustion engines which will be effective at all temperatures, to prevent the escape of compressed gases confined by the piston within the cylinder past the piston as it reciprocates within the cylinder and which will prevent by-passing of lubricating oil around the piston and the rings carried thereby upwardly into the compression chamber of the cylinder.

The invention more specifically stated embodies a ring constructed of cast iron or any suitable material which is split and circumferentially expansible. It also embodies means for retaining the ring in snug engagement with the upper wall of the piston groove whether the piston is travelling in an upward or a downward direction, and it furthermore embodies means for removing surplus oil from the cylinder walls, and for returning the same to the crank case of the engine.

One form which my invention may assume is exemplified in the following description and illustrated in the accompanying drawings, in which—

Figure 1:
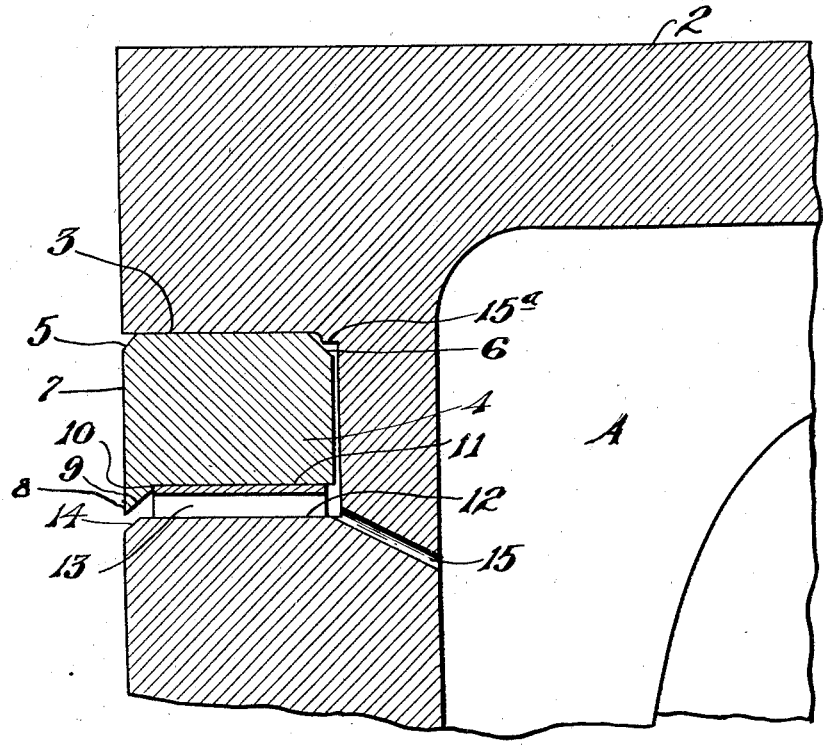
Fig. 1 is an enlarged cross section of a piston showing the position of the piston ring in the groove.
Figure 2:
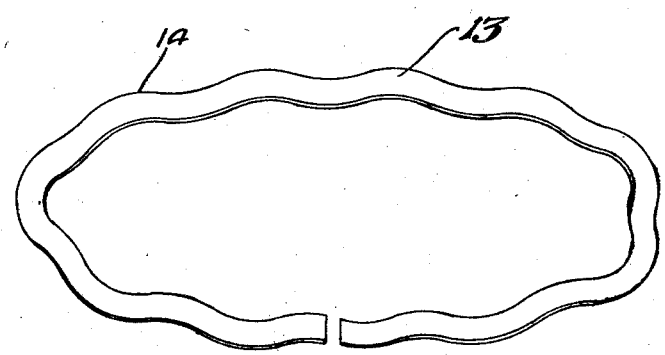
Fig. 2 is a perspective view of the spring ring.

Referring to the drawings in detail, and particularly to Fig. 1, A indicates in general the piston, 2 the head of the piston, 3 the piston ring grooves, and 4 the piston ring proper. This ring is constructed of cast iron or any other suitable material and is split to permit circumferential expansion. The cross section of the ring shows that the upper face of the ring is bevelled at the outer and inner edge as indicated at 5 and 6, respectively, and these bevelled faces serve functions which will hereinafter be described. The outer face of the ring indicated at 7 is that which contacts with the cylinder wall and this surface terminates in a lower annular scraping edge as indicated at 8, said edge being formed by an inner annular bevelled surface 9 and an annular shoulder 10. The depth of the ring indicated by dotted lines at B is less than the depth of the groove in the piston and as such is the case a space is formed between the lower face of the ring indicated at 11 and the lower seat of the groove indicated at 12. This space is provided for the reception of an annular ring 13, which is constructed of flat spring steel. The ring is waved or corrugated, as shown at 14, in Fig. 2, and as such exerts a constant upward pressure on the ring to maintain contact between the upper face of the ring and the seat 3. This is of great importance as it prevents pumping action of the ring, hereinafter to be described.

The spring ring 13 is split to permit ready insertion thereof, but it is not necessarily circumferentially expansible. The annular scraping edge serves as a means of retaining the spring ring in position as the annular shoulder or seat 10 engages the ring and thereby prevents spreading of the same. It further prevents accidental contact of the spring ring with the cylinder surface, which might cause scoring of the cylinder due to the harder material employed in the ring. The lower face of the groove is also bevelled at its outer edge shown at 14, and a plurality of oil returning ducts is provided as indicated at 15.

For the purpose of clearly explaining the function of the ring and the advantages obtained by the particular construction in cross section shown, the following statements regarding the general operation and practice will be made:

Common practice shows that ordinary piston rings are always of a slightly less height or thickness than the piston groove, therefore on the up stroke of the piston the ring will tend to seat on the bottom of the piston groove, and on the down stroke of the piston, the tendency will be to engage the upper face of the groove. However when high pressures are produced above the piston, the ring does not always seat against the upper face as it should and hence leakage of gases around the ring will take place and under all conditions a pumping action of oil around the ring takes place due to the vertical play of the ring in the groove. In the present instance these objections have been entirely overcome as contact is maintained between the upper face of the groove and the ring, due to the continuous pressure exerted by the spring ring 13. Leakage of gases around or behind the ring is in this manner prevented and pumping action of oil is entirely eliminated. The bevelled annular face indicated at 5 avoids scraping action, which will tend to elevate the oil in the cylinder when the piston travels in an upward direction, as the oil will have a tendency to wedge itself downwardly between the bevelled face 5 and the cylinder wall and will thus wedge itself between the ring and the wall and thereby form a thin film, ideal for lubricating purposes. The general tendency of the oil is to travel upwardly with the piston and to finally by-pass the same and enter the compression chamber where it carbonizes, fouls the plugs, etc., for this reason the annular scraping edge 8 is provided. This edge will engage the film of oil during the downward stroke of the piston and will force it into the space formed between the lower face of the ring 4 and the lower seat of the groove indicated at 12, and as it collects in this space it will be gradually returned to the crank case through the ducts 15. The bevelled face indicated at 14 serves the same function as the bevelled face 5, that is if a sharp edge or corner was produced at this point a scoring action would result and oil would have a tendency to be elevated. Such elevation is avoided by forming the faces 5 and 14 as shown.

Displacement of the ring 13 or wedging of the same outwardly between the ring 4 and the lower face 12 of the piston groove is entirely eliminated due to the provision of the scraping edge 8 and the seat or annular shoulder 10. The bevelled face indicated at 6 is also important, particularly when replacement of old rings is made. By referring to Fig. 1, it will be noted that a slight shoulder or seat is indicated at 15$^a$. If a piston has been in use a considerable length of time and ordinary rings have been employed, it will be found upon examination that the hammering or pumping action of the rings has caused scoring of the faces 3 and 12 and that annular shoulders, such as shown at 15$^a$, will have to be formed. If ordinary new rings are employed, it would be necessary to place the piston in a lathe and to return the seats 3 and 12 to remove the shoulders 15$^a$ but such extra trouble is eliminated in the present instance by forming the annular bevelled face indicated at 6. This face forms a clearance between the piston ring and the shoulder 15$^a$ and thus permits the ring to seat snugly or engage the surface 3, thereby avoiding the unnecessary work of returning the piston ring grooves.

The piston ring here shown is exceedingly simple and substantial in construction and has in actual practice proven that pumping action of the rings is entirely eliminated and that gas leakage and losses of this character are reduced to a minimum. Carbon formation in the compression chamber, and fouling of the plugs are similarly avoided and a general higher efficiency and power output is obtained.

While the ring here shown is more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. The combination with a piston having a circular ring groove formed in its exterior surface, of a split circumferentially expansible ring adapted to be received by the groove, a bevelled annular surface formed on the upper edge of the ring, an annular knife like scraping edge formed on the lower exterior surface of the ring, said ring having a vertical height which is less than the vertical height of the ring groove to form a space between the lower side of the ring and the lower face of the groove, a spring ring insertible in said space and engageable with the piston ring to maintain it in constant engagement with the upper surface of the ring groove, and a drain duct formed in the piston and communicating at one end with the interior of the piston and at the opposite end with the space formed between the piston ring and the groove.

2. A piston ring which is substantially square in cross section, said ring being split to permit circumferential expansion, the upper exterior and inner edges of said ring being bevelled to form annular angularly disposed inner and outer faces, a knife like annular scraping edge formed on the lower edge of the ring and also forming a part of the exterior annular surface of the ring, and an annular shoulder formed in the lower face of the ring interiorly of the scraping edge.

WILLIAM R. HESLEWOOD.